(12) United States Patent
Bailey

(10) Patent No.: US 8,894,148 B2
(45) Date of Patent: Nov. 25, 2014

(54) THREE-IN-ONE CAR SEAT

(71) Applicant: Linda Carol Bailey, Braselton, GA (US)

(72) Inventor: Linda Carol Bailey, Braselton, GA (US)

(73) Assignee: Linda C. Bailey, Buford, GA (US)

( * ) Notice: Subject to any disclaimer, the term of this patent is extended or adjusted under 35 U.S.C. 154(b) by 0 days.

(21) Appl. No.: 13/918,357

(22) Filed: Jun. 14, 2013

(65) Prior Publication Data

US 2014/0035334 A1 Feb. 6, 2014

Related U.S. Application Data

(60) Provisional application No. 61/690,123, filed on Jun. 20, 2012.

(51) Int. Cl.
| | | |
|---|---|---|
| *A47D 1/10* | (2006.01) | |
| *B60R 15/04* | (2006.01) | |
| *B60N 2/32* | (2006.01) | |
| *B60N 2/28* | (2006.01) | |

(52) U.S. Cl.
CPC . *B60N 2/32* (2013.01); *B60R 15/04* (2013.01); *B60N 2/2866* (2013.01); *Y10S 4/902* (2013.01)
USPC ................ 297/250.1; 297/118; 4/478; 4/483; 4/902

(58) Field of Classification Search
USPC ...................... 4/476, 478, 479, 480, 483, 902; 297/250.1, 254, 255, 256, 118
See application file for complete search history.

(56) References Cited

U.S. PATENT DOCUMENTS

| | | | | |
|---|---|---|---|---|
| 181,397 | A * | 8/1876 | Beyron | 4/478 |
| 577,136 | A * | 2/1897 | Honeywell | 4/478 |
| 808,049 | A * | 12/1905 | Hardy | 297/188.19 |
| 2,073,390 | A * | 3/1937 | Giblette | 4/478 |
| 2,320,845 | A * | 6/1943 | Bolton | 4/452 |
| 3,213,467 | A * | 10/1965 | Hubbard | 4/478 |
| 3,245,090 | A * | 4/1966 | Slimmer | 4/478 |
| 4,199,826 | A * | 4/1980 | Devereux | 4/479 |
| 4,266,305 | A * | 5/1981 | Kavaloski et al. | 4/480 |
| 4,759,086 | A * | 7/1988 | Booth-Cox | 4/451 |
| 4,888,833 | A * | 12/1989 | Garcia et al. | 4/480 |
| 5,359,737 | A * | 11/1994 | Hodge | 4/483 |
| 5,781,939 | A * | 7/1998 | Bledsoe | 4/483 |
| 7,237,278 | B1 * | 7/2007 | Scott | 4/661 |
| 7,562,400 | B2 * | 7/2009 | Graham | 4/480 |
| 7,604,294 | B2 * | 10/2009 | Jane Santamaria | 297/250.1 |
| 7,625,043 | B2 * | 12/2009 | Hartenstine et al. | 297/250.1 |
| 7,770,242 | B2 * | 8/2010 | Sell | 4/484 |
| 7,779,489 | B2 * | 8/2010 | Finell | 4/483 |
| 8,182,035 | B2 * | 5/2012 | Hartenstine et al. | 297/256.13 |
| 8,276,988 | B2 * | 10/2012 | Hartenstine et al. | 297/250.1 |
| 8,579,372 | B2 * | 11/2013 | Wessman et al. | 297/250.1 |
| 8,727,439 | B2 * | 5/2014 | Herzberg | 297/250.1 |

(Continued)

*Primary Examiner* — David E Allred

(57) ABSTRACT

I came up with the idea of the "Three-in-One Car Seat" because of the benefits and convenience for both parents and children. Now parents do not need to carry a car seat, a potty, and a booster seat when on the go. Some of the benefits of this car seat includes: keeping your child on track during potty training, safe from dangerous germs and bacteria (such as *e-coli*) found in public restrooms, as well as the convenience of having a potty ready for your child whenever he/she needs it, because everything needed can now be housed in one unit. It also comes in a handy for older kids too. This car seat takes a child from car seat, booster seat, potty training and beyond!

1 Claim, 5 Drawing Sheets

(56) References Cited

U.S. PATENT DOCUMENTS

| | | | |
|---|---|---|---|
| 2002/0043859 A1* | 4/2002 | Smith | 297/392 |
| 2004/0070244 A1* | 4/2004 | Williams et al. | 297/250.1 |
| 2004/0124677 A1* | 7/2004 | Meeker et al. | 297/255 |
| 2005/0082888 A1* | 4/2005 | Williams et al. | 297/250.1 |
| 2007/0017015 A1* | 1/2007 | Finell | 4/483 |
| 2008/0030054 A1* | 2/2008 | Williams et al. | 297/250.1 |
| 2008/0036256 A1* | 2/2008 | Gold et al. | 297/255 |
| 2008/0258526 A1* | 10/2008 | Mendenhall | 297/250.1 |
| 2010/0289307 A1* | 11/2010 | Biaud et al. | 297/250.1 |
| 2012/0084909 A1* | 4/2012 | Dunn et al. | 4/483 |
| 2012/0235455 A1* | 9/2012 | Maassarani | 297/250.1 |
| 2014/0062150 A1* | 3/2014 | Strong et al. | 297/250.1 |
| 2014/0157506 A1* | 6/2014 | Morris | 4/483 |

\* cited by examiner

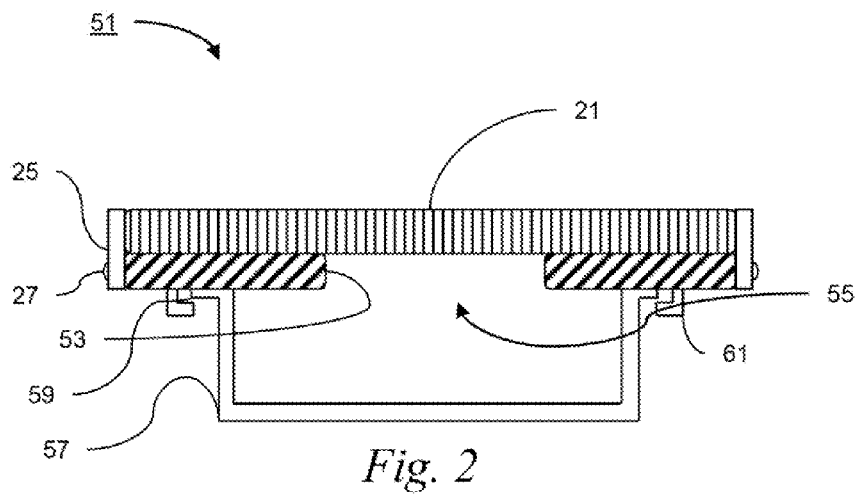
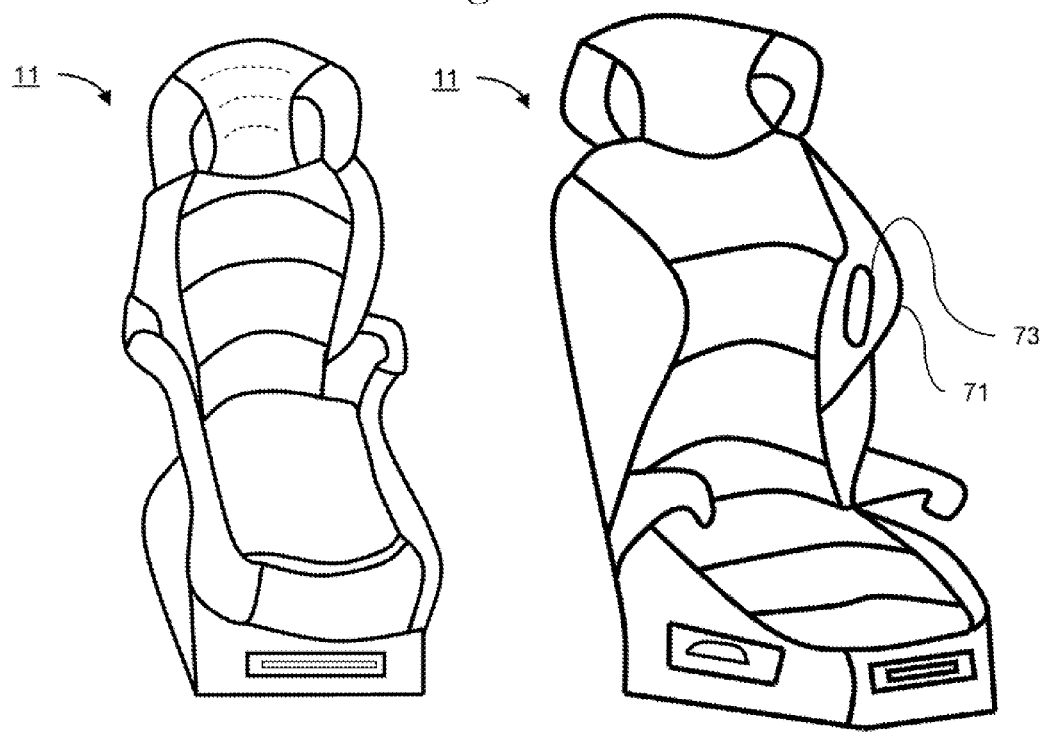
Fig. 2
Fig. 3          Fig. 4

THREE-IN-ONE CAR SEAT

TECHNICAL FIELD

The present invention relates to a child safety seat, and more particularly, to a child safety seat with at potty assembly and removable back that allows the child safety seat to convert to a booster seat.

BACKGROUND

Child safety seats are designed for use in automobiles to protect children from injury. The seats typically provide a passive restraint for the child and are secured to the seat belt assembly or some fixed point in the automobile.

One of the disadvantages of existing child safety seats is that when an infant is placed in the seat during a long trip, the infant must be taken out of the seat to be changed whenever the infant goes potty.

U.S. Pat. No. 5,359,737, issued to Hodge, on Nov. 1, 1994 discloses a convertible multi-functional seat apparatus. This seat apparatus also includes a seat on the cover supported on the seat for movement between a first position adjacent to the seat in which the cover overlies and conceals the opening and a second position remote from the seat in which the covers displaced from and exposes the opening. The potty assembly is disposed in the opening and supported by an internal rim of the seat forming the opening therein. The potty assembly includes a replaceable plastic bag and an annular retainer rings supporting the bag about a peripheral edge portion thereof in the opening by the internal rim of the seat.

SUMMARY

A child car seat is provided that has at flip-up seat with a potty underneath. Now when you're on the go, potty training does not need to be put on hold and your child no longer has to be exposed to public rest rooms or receiving mixed signals from mom and dad or when to and not to soil his or her pants if you can't make it to a rest room in time; because the potty can not come along on the trip or when your just out and about. With the child car seat of the present invention, the training does not need to be interrupted.

The child car seat of the present invention will have an adjustable padded headrest for neck support with pull down chin support located on the inside of the uniquely designed side wings. The child car seat also has EPS foam or foam best suited to provides extra safety for the child in a side-impact crash. The chin support is designed to keep the child's head from dropping down when napping while on the go. The child car seat has the appearance of a tiny wing back chair. To release the chin support, push in and pull down. To return, push the support up and back in. The chair has an easily removable and washable cover.

The potty seat is built for comfort and can support up to 22-100 pounds with ease and comfort with its angled seat to catch spills and a padded lid for comfort. It also has a wide base and spill resistant surfaces for easy cleaning and doubles as a booster seat by snapping down the car seat bottom to the seat base.

BRIEF DESCRIPTION OF THE DRAWINGS

Other objects and features of the present invention will become apparent from the following detailed description considered in connection with the accompanying drawings which disclosed embodiments of the present invention. It should be understood, however, that the drawings are designed for the purpose of illustration only and not as a definition of the limits of the invention.

FIG. 2 is cross-sectional view of a pot assembly element of the present invention.

FIG. 3 is a perspective view of an alternate embodiment of a child car seat of the present invention.

FIG. 4 is a perspective view of an alternate embodiment of a child car seat of the present invention.

DETAILED DESCRIPTION OF ILLUSTRATIVE EMBODIMENTS

Figure 1:
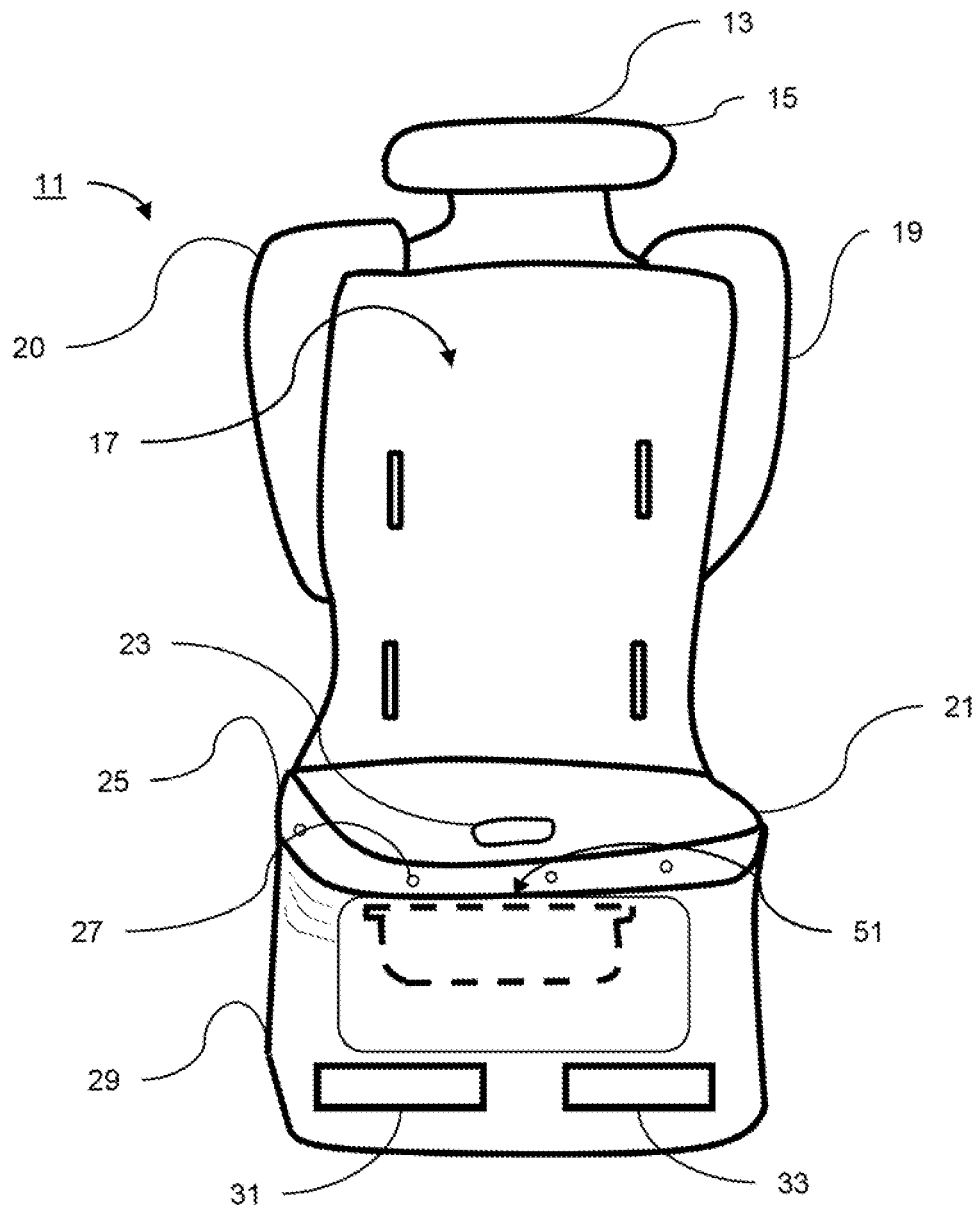
FIG. 1 is a perspective view of a child car seat of the present invention.

Illustrated in FIG. 1 is a child car seat 11 in accordance with the present invention. The child car seat 11 includes an adjustable padded head rest 13 and a neck support 15 intended to support the neck and head of the child. The headrest 13 and neck support 15 are attached to a back member 17. Connected to the back member 17 are a pair of side support members (arms) 19 and 20 made of resilient materials such as EPS foam or other synthetic foam materials that provide side support for the child. The side support members 19 and 20 are connected to the back member 17 in a manner that allows them to be displaced vertically so as to adjust the lateral support feature to the size of the child. The child car seat 11 also includes a padded seat 21 that includes an opening 23 to accommodate a seatbelt lock for locking a seatbelt (not shown) to restrain the child. The padded seat 21 rests on top of a pot assembly 51 (shown in dashed lines and illustrated in cross-section in FIG. 2). The padded seat 21 is secured to the pot assembly 51 by means of a flap 25 having a plurality of snap fasteners 27. The padded seat 21 will have a 2-inch wide edge band with snap fasteners. The fasteners to the seat cover to secure it and prevent movement. In one embodiment the padded seat 21 can lift up and down and snaps in place for a snug fit over the potty's lid underneath.

A typical potty seat is built for comfort and can support up to 22-100 pounds with ease and comfort with its angled seat to catch spills and a padded lid for comfort. It also has a wide base and spill resistant surfaces for easy cleaning and doubles as a booster seat by snapping down the car seat bottom to the seat base.

A typical seat cushion will be about 1.5" in thickness for comfort with a quilted pattern design. The pot assembly 51 is secured to a seat pedestal 29 that includes at least one tray 31 or plastic disposable bags and one tray 33 for wet wipes. These disposable bags will have an elastic band at the opening, this band will allow the bag to have a tight fit when it is pulled down over the curved ream of pot and will keep the elastic from raising above the ream of the pot. About 2" down on the bag's elastic, there will have a closing strip for securing the waste container inside. The bottom of the bag will have an absorbent and leak proof liner.

The pedestal 29 may be made of plastic. The drawers will also have a raised line located at the bottom. Inside of the pedestal 29 the lower right and left bottom sides will have a raised line. This line is designed to keep the trays 31 and 33 from pulling all the way out, by connecting with the lines on the bottom of the tray and connecting with the raised line at the bottom of the base floor when the two lines meet. Access to the pot assembly is provided by means of a pivotable member 35. Alternately the seat 21 may flip up to provide access to the pot assembly 51.

Illustrated in FIG. 2 is a pot assembly 51. The pot assembly 51 includes the padded seat 21 that rests on a padded seat support member 53 that has an opening 55 that allows the child to use the seat as a potty chair. The pot assembly 51 also includes a pot 57 in the form of a receptacle having a protruding portion 59 that engages a pair of parallel tracks 61. The top of the pot will have a curved lip which is designed to hold plastic deposable bag in place when lining the inside of the pot, and also allows for a spill-proof seal. The pot 57 may be removed from the front of the seat assembly by pulling it along the parallel tracks 61. A typical pot embodiment may have a removable plastic catcher's cup for little boys. The top of the pot will have a curved lip which is designed to hold the plastic deposable bag in place when lining the inside of the pot, and also allows for a spill-proof seal. A typical pot size will be 13" round and 5" deep.

A typical plastic disposable bags will have an elastic band at the opening, this band will allow the bag to have a tight fit when it is pulled down over the curved ream of the pot and will keep the elastic from raising above the ream of the pot. About 2" down on the bag's elastic, there will have a closing strip for securing the waste container inside. The bottom of the bag will have an absorbent and leak proof liner.

Illustrated in FIG. 3 is an alternate embodiment of the child car seat 11. In the embodiment of FIG. 3 is shown that the head rest 13 and each neck support 15 may be integrally formed for aesthetic reasons.

Illustrated in FIG. 4 is yet another alternate embodiment of the car seat 11 that is provided with a pair of movable side supports 71 having in integrally formed pullout chin support 73.

The car seat's lower back portion will have an anchor support located on the bottom. The push-to-close latch will be attached at the bottom of the base. This latch or lock will be part #1, the latch or lock connect with the receptacle located on the top of the back of the potty and car seat. This is part #2, parts 1 & 2 connects the car seat, potty seat and booster seat, as they became one unit. Underneath will be where the latch lock #1 will be attached to the leg. The spring locks at located at each end inside the base. The leg then goes down into the anchor or base and connects with the spring locks.

Figure 5:
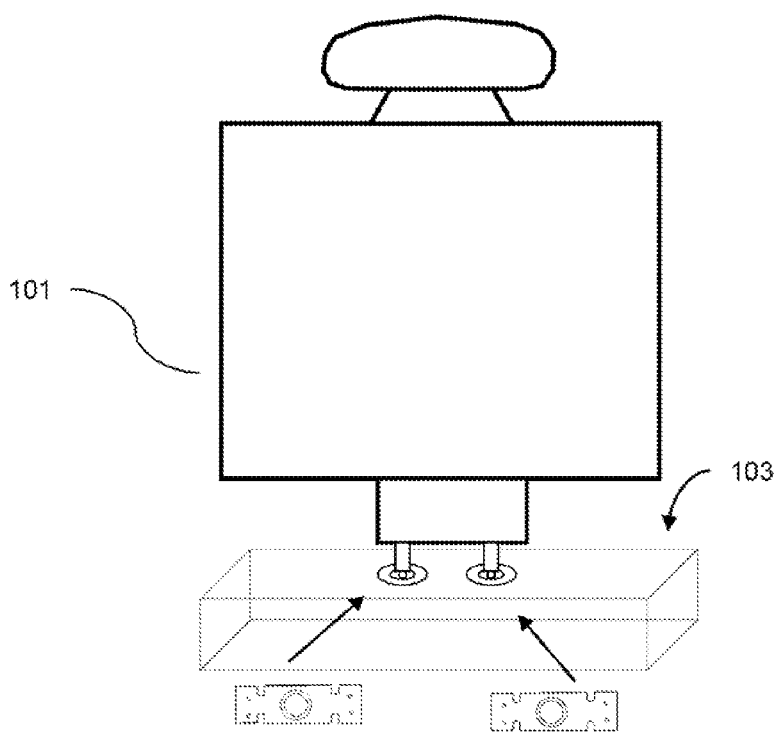
FIG. 5 is a front view of a removable back member for use with as child car seat of the present invention.
Figure 6:
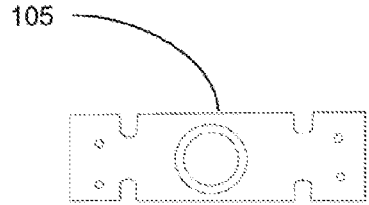
FIG. 6 is a top view of a female a locking member for use with the child car seat of the present invention.
Figure 7:
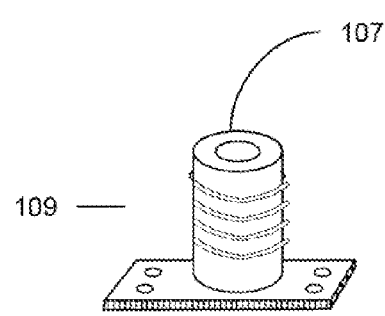
FIG. 7 is a perspective view of a male locking member for use with the child car seat of the present invention.
Figure 8:
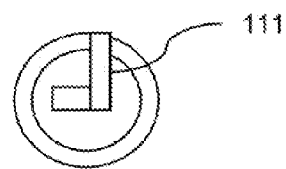
FIG. 8 is a top view of the locking element for use with the child car seat of the present invention.
Figure 9:
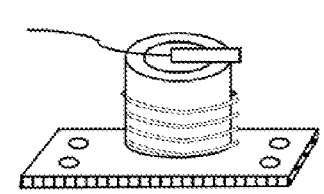
FIG. 9 is a perspective view of a compressed male locking member for use with the child car seat of the present invention.

In another embodiment illustrated in FIG. 5 the lower portion of the child car seat chances into a booster seat when the back of the car seat 101 is removed. This is done by a push & lock locking system 103 that allows the back or upper section of the car seat to disconnect from the bottom section by just pushing down on the back of the chair and then pulling it up and out. Illustrated in FIG. 6 is the female member 105 of the push and lock the locking system 103. The female member 105 is bolted or secured to the seat pedestal and engages a male member 107 (illustrated in FIG. 7) that is secured to the back of the seat 101. The male member 107 may include a spring 109 that allows the top portion of the manual member to be displaced and a locking tab 111 to be engaged with the female member 105 (as illustrated in FIGS. 7, 8 and 9). Now it's gone from car seat to booster seat. The booster seat will have rotating armrests to get in and out with ease and pullout cup holders on the bottom right and left side of the booster seat. The child car seat of the present invention will be the only car seat that apparent to me because it changes to meet the needs of for every stage of the child's use.

Figure 10:
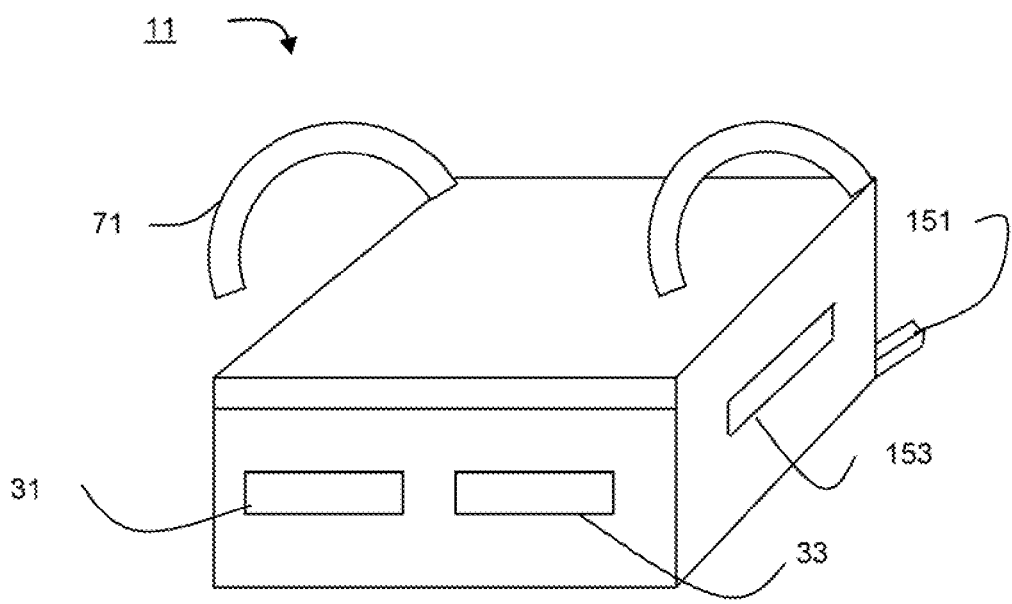
FIG. 10 is an illustration of a child car seat with the back removed to be used as a booster seat.

Illustrated in FIG. 10 is a child car seat 11 with the back removed. In this configuration the child car seat 11 can serve as a booster seat. The child car seat 11 includes a pair of movable side arms 71 to restrain the infant. Also included are a pair of protrusions 151 to prevent the seat from rolling over. The child car seat 11 also includes the padded seat 21 that can serve as a potty is lid. The child car seat 11 may include trays 31 and 33 for plastic bags an x-ray for wet wipes as well as cup holder 153 for the infant.

Figure 11:
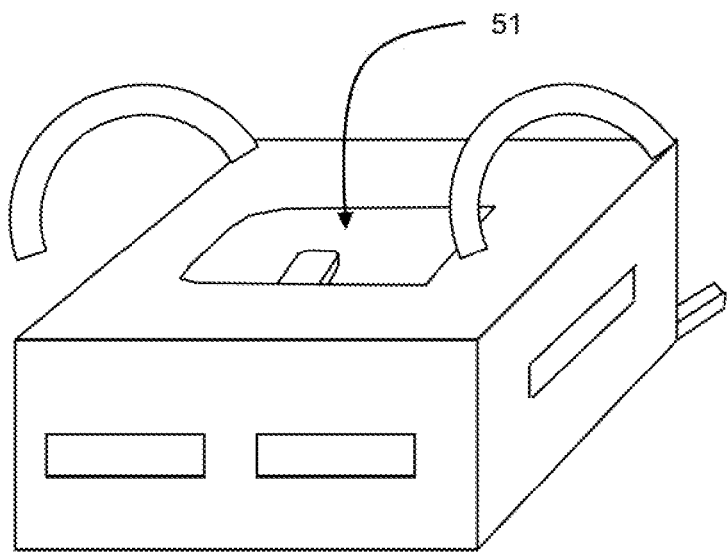
FIG. 11 is an illustration of a child car seat with the potty lid removed.

Illustrated in FIG. 11 is the child car seat 11 with the padded seat removed. The child car seat 11 includes an opening to the pot assembly 51.

Figure 12:
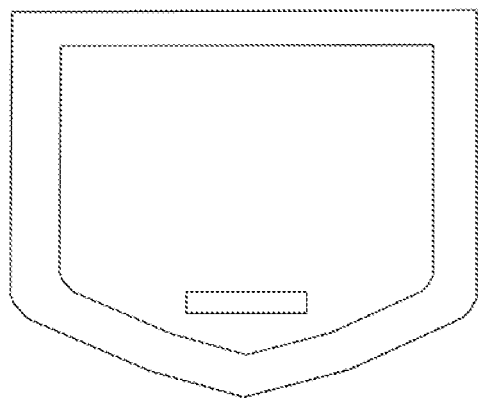
FIG. 12 is a top view of the potty lid.

Illustrated in FIG. 12 is an alternate embodiment of the padded seat 21 illustrating the snap attachments 27 to secure the padded seat 21 to the pedestal or pot assembly 51.

Figure 13:
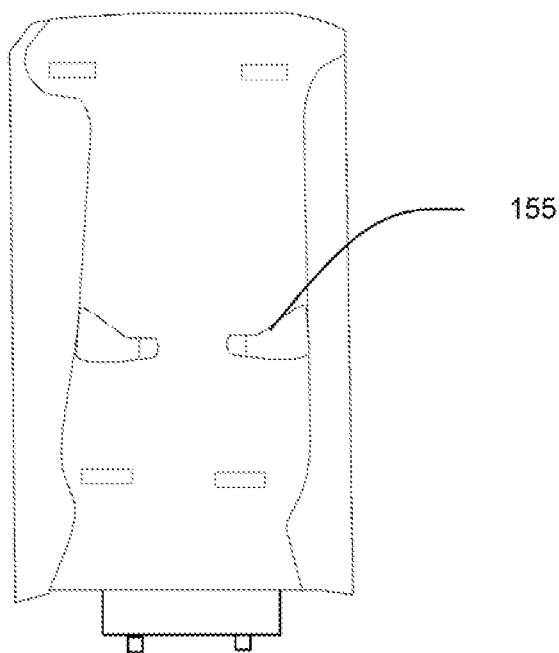
FIG. 13 is a front view of an alternate embodiment of the back of the child car seat.

Illustrated in FIG. 13 is an alternate embodiment of the back member 17 of the child car seat 11. In this embodiment the side supports 71 include a retractable chin support 155 that may be used to support the chin of the infant while the infant sleeps.

The present invention may be embodied in other specific forms without departing from its spirit or essential characteristics. The described embodiments are to be considered in all respects only as illustrative and not restrictive. Thus, it is intended that the present invention include modifications and variations that are within the scope of the appended claims and their equivalents. All references recited herein are incorporated herein in their entirety by specific reference.

What is claimed:

1. A child car seat comprising:
   a pedestal, the pedestal having a top opening through an upper wall of the pedestal providing access to an inside of the pedestal;
   a cushioned seat supported by the pedestal and covering the top opening;
   a back member removably attached to a rear of the pedestal;
   a pair of side wings vertically adjustably secured to the lateral sides of the back member;
   at least one chin support retractably supported on at least one of the side wings;
   a pot assembly secured to the pedestal the pot assembly including:
     a support member comprising a portion of the upper wall of the pedestal having the top opening therein,
     a pair of parallel tracks secured to the support member,
     a pot access port comprising a front opening in a front wall of the pedestal, and
     a pot slideable engaged with the parallel tracks for easy access of the pot through the pot access port; and
   at least one tray slideably supported in the pedestal below the pot access port when the child car seat is in a position of use, the tray slidealbe through the front wall of the pedestal for accessing the tray.

* * * * *